United States Patent
Xu et al.

(10) Patent No.: US 8,218,080 B2
(45) Date of Patent: Jul. 10, 2012

(54) PERSONAL SETTINGS, PARENTAL CONTROL, AND ENERGY SAVING CONTROL OF TELEVISION WITH DIGITAL VIDEO CAMERA

(75) Inventors: Ning Xu, Irvine, CA (US); Sangkeun Lee, Irvine, CA (US); Yeong-Taeg Kim, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1481 days.

(21) Appl. No.: 11/448,961

(22) Filed: Jun. 6, 2006

(65) Prior Publication Data

US 2007/0126884 A1 Jun. 7, 2007

Related U.S. Application Data

(60) Provisional application No. 60/742,704, filed on Dec. 5, 2005.

(51) Int. Cl.
*H04N 7/00* (2011.01)
(52) U.S. Cl. ....................................................... 348/552
(58) Field of Classification Search .................. 348/552, 348/553, 725, 152, 143, 345; 382/118, 190, 382/209, 195; 235/462.26
See application file for complete search history.

(56) References Cited

U.S. PATENT DOCUMENTS

| | | | |
|---|---|---|---|
| 5,164,992 A * | 11/1992 | Turk et al. ...................... 382/118 |
| 5,585,841 A * | 12/1996 | Hardin ........................... 348/163 |
| 5,691,772 A * | 11/1997 | Suzuki ......................... 348/223.1 |
| 5,799,111 A | 8/1998 | Guissin | |
| 5,819,035 A | 10/1998 | Devaney et al. | |
| 5,920,356 A | 7/1999 | Gupta et al. | |
| 6,389,177 B1 | 5/2002 | Chu et al. | |
| 6,643,410 B1 | 11/2003 | Yu et al. | |
| 6,795,106 B1 * | 9/2004 | Cooper ...................... 348/14.08 |
| 6,898,321 B1 | 5/2005 | Knee et al. | |
| 7,097,102 B2 * | 8/2006 | Patel et al. ..................... 235/454 |
| 7,120,278 B2 * | 10/2006 | Sukegawa et al. ............ 382/118 |
| 7,170,933 B2 | 1/2007 | Kouloheris et al. | |
| 7,260,823 B2 * | 8/2007 | Schlack et al. ..................... 725/9 |
| 7,630,561 B2 * | 12/2009 | Porter et al. .................. 382/218 |
| 7,636,456 B2 * | 12/2009 | Collins et al. ................. 382/118 |
| 7,643,658 B2 * | 1/2010 | Kilner et al. .................. 382/118 |
| 7,734,098 B2 * | 6/2010 | Kikkawa et al. .............. 382/195 |
| 2003/0071908 A1* | 4/2003 | Sannoh et al. ................ 348/345 |
| 2005/0013494 A1 | 1/2005 | Srinivasan et al. | |
| 2005/0254782 A1* | 11/2005 | Hsu ................................. 386/52 |
| 2006/0251382 A1* | 11/2006 | Vronay et al. ................... 386/52 |

(Continued)

FOREIGN PATENT DOCUMENTS

EP 1168823 A2 1/2002

(Continued)

OTHER PUBLICATIONS

European Search Report by the European Patent Office for European Application No. 07102176 dated Sep. 28, 2007, pp. 1-12, Berlin, Germany.

(Continued)

*Primary Examiner* — Paulos M Natnael

(57) ABSTRACT

A digital system is provided that combines a digital video camera with television displays, and controlled by a controller module to enhance television performance according to personal television settings, parental controls and energy saving functions, achieved by utilizing the camera and face detection/recognition methods implemented in the controller module.

24 Claims, 4 Drawing Sheets

U.S. PATENT DOCUMENTS

| | | | |
|---|---|---|---|
| 2007/0058726 | A1 | 3/2007 | Ha et al. |
| 2007/0206871 | A1 | 9/2007 | Jalil et al. |
| 2007/0237241 | A1 | 10/2007 | Ha et al. |
| 2007/0280552 | A1 | 12/2007 | Lee et al. |

FOREIGN PATENT DOCUMENTS

| | | | |
|---|---|---|---|
| KR | 20000033070 A | | 6/2000 |
| KR | 2002036867 A | * | 5/2002 |
| WO | 0022834 A2 | | 4/2000 |
| WO | 03010716 A2 | | 2/2003 |
| WO | 2005060272 A1 | | 6/2005 |
| WO | 2005111938 A2 | | 11/2005 |

OTHER PUBLICATIONS

Wang, Z. et al., "Blind Measurement of Blocking Artifacts in Images," Proceedings of the 2000 International Conference on Image Processing (ICIP 2000), IEEE, Sep. 2000, vol. 3 pp. 981-984, United States.

Wang, Z. et al., "No-reference Perceptual Quality Assessment of JPEG Compressed Images," Proceedings of the 2000 International Conference on Image Processing (ICIP 2002), IEEE, Sep. 2002, vol. 2, pp. I-447-I-480, United States.

US Non-final Office Action for U.S. Appl. No. 11/399,846 mailed Feb. 16, 2010.

U.S. Final Office Action for U.S. Appl. No. 11/399,846 mailed Aug. 4, 2010.

U.S. Non-Final Office Action for U.S. Appl. No. 11/448,373 mailed May 13, 2009.

U.S. Final Office Action for U.S. Appl. No. 11/448,373 mailed Oct. 29, 2009.

U.S. Non-Final Office Action for U.S. Appl. No. 11/448,373 mailed Mar. 17, 2010.

U.S. Final Office Action for U.S. Appl. No. 11/448,373 mailed Aug. 4, 2010.

* cited by examiner

PERSONAL SETTINGS, PARENTAL CONTROL, AND ENERGY SAVING CONTROL OF TELEVISION WITH DIGITAL VIDEO CAMERA

RELATED APPLICATION

This application claims priority, under 35 U.S.C. 119(e), of U.S. provisional patent application Ser. No. 60/742,704, filed on Dec. 5, 2005, incorporated herein by reference in its entirety.

FIELD OF THE INVENTION

The present invention relates to applications and systems for televisions that have a digital video camera attached, and in particular to personal viewing settings, parental control and energy saving controls of the television.

BACKGROUND OF THE INVENTION

There have been many research achievements in vision technologies and some of them have become feasible for practical applications, such as face detection and recognition. At the same time, digital video cameras, especially the low resolution Web cameras (webcams), are made very cheap and have become largely available for daily applications in the price aspect.

Digital television industry will benefit from these two facts by attempting connecting a TV set to a video camera. The challenge is in developing systems and applications based on the vision technology achievements. There is, therefore, a need for new systems and applications that combine television together with a digital video camera.

BRIEF SUMMARY OF THE INVENTION

An object of the present invention is to provide new systems and applications that combine television together with a digital video camera. In one embodiment, the present invention provides systems and related methods and applications for using a digital video camera together with a television set. The present invention addresses components of the new systems that combine television and video camera and addresses new applications and corresponding methods that improve the performance of a television with the help of live video feed from the digital video camera.

With the attached video camera, the television applies face detection and recognition techniques to find out who the viewer is and automatically changes to the viewer's favorite settings and/or apply the preset parental control for this viewer. The face detection output could also help the energy saving controls of the television.

These and other features, aspects and advantages of the present invention will become understood with reference to the following description, appended claims and accompanying figures.

DETAILED DESCRIPTION OF THE INVENTION

Figure 1:
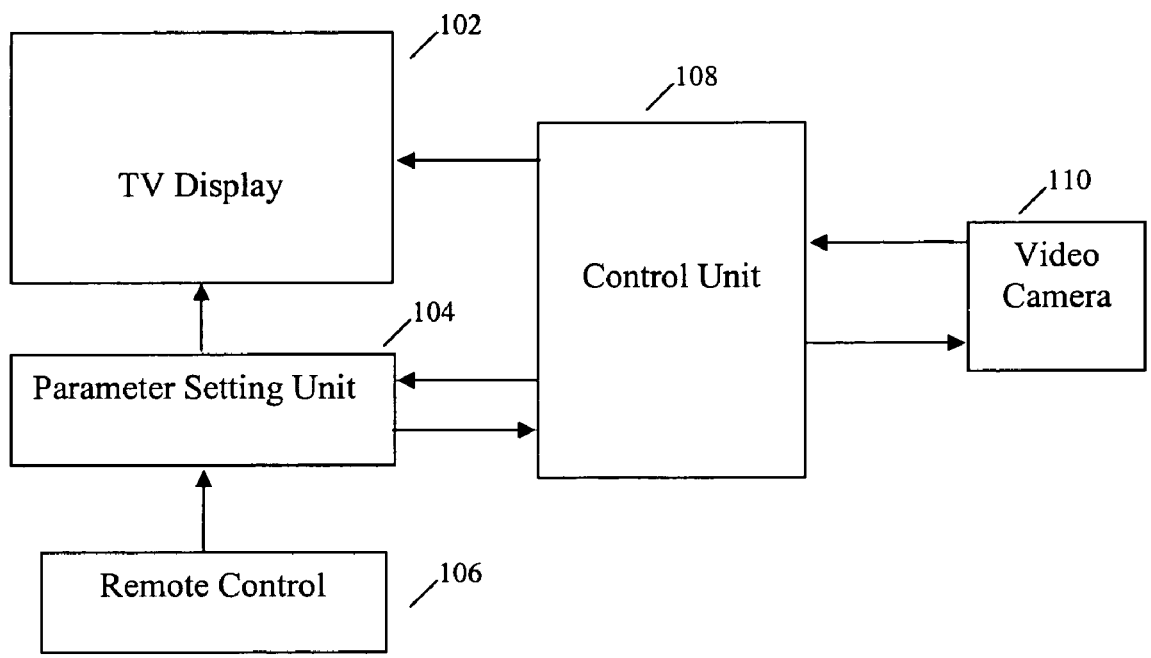
FIG. 1 shows a functional block diagram of a system according to an embodiment of the present invention, which provides personal settings, parental control, and energy saving control of television with digital video camera combination.

FIG. 1 shows a functional block diagram of a system 100, according to an embodiment of the present invention, which provides personal settings, parental control, and energy saving control of television with digital video camera combination. The system 100 comprises a television display 102, a parameter setting module 204, a remote control 106, a controller module 108 and a digital video camera 110. The television display is further connected to a parameter setting module 104. Module 104 can be either in television or set-top box.

Different ways of integrating the above components are contemplated by the present invention. In one example, the camera 110, the controller module 108, the parameter setting module 104 and the display 102 are integrated (embedded) in a television set. In another example, the controller module 108, the parameter setting module 104 and the television display 102 are integrated in a TV set, and the camera 110 is then connected to the controller module 108. In another example, the television display 102 is a common TV set, but connected to a set-top box into which the controller module 108, the parameter setting module 104 and the camera 110 are integrated. Yet in another example, the television display 102 connects to a set-top box embeds the parameter setting module 104, the controller module 108, to which the camera 110 is then connected. Other ways of integrating/embedding the above components are possible and contemplated by the present invention, and the example system block diagram.

FIG. 1 illustrates functional interaction of the modules 102-110 for any one of the above examples. The camera 110 outputs video signals (i.e., video stream) to the controller module 108, and receives control signals (e.g., on/off, zooming, panning, etc.) from the controller module 108. The controller module 108 receives input from the parameter setting module 104 of the television, and selectively routes the video stream from the camera 110 to the television display 102. The camera 110 is positioned such that the faces of viewers of the television 102 are within the field of view of the camera 110. Further, more than once camera 110 may be utilized and connected to the controller module 108.

The controller module 108 further generates control signals to the parameter setting module 104, to change the current settings of the television display 102. The parameter setting module 104 further receives input signals from the remote control 106 and generates setting signals to the television display 102. The setting signals include whether to show a live video stream from the camera 110, in a PIP (picture in picture) mode or full screen mode, whether to show the input TV video signals connected directly to the Television with the current settings, or limit the input channels, etc.

The camera 100 may have different resolution and frame rates, and can be e.g. an infrared camera. The video captured by the digital video camera 110 is directly sent to the controller module 108 which, based on need/command, transforms the video format to one of the formats the television display 102 can render. The controller module 108 is able to output a control signal to switch on and off the video camera 110. If the digital video camera 110 has zooming or panning functionality, the controller module 108 is also capable of output the corresponding control signals to control these functions.

Figure 2:
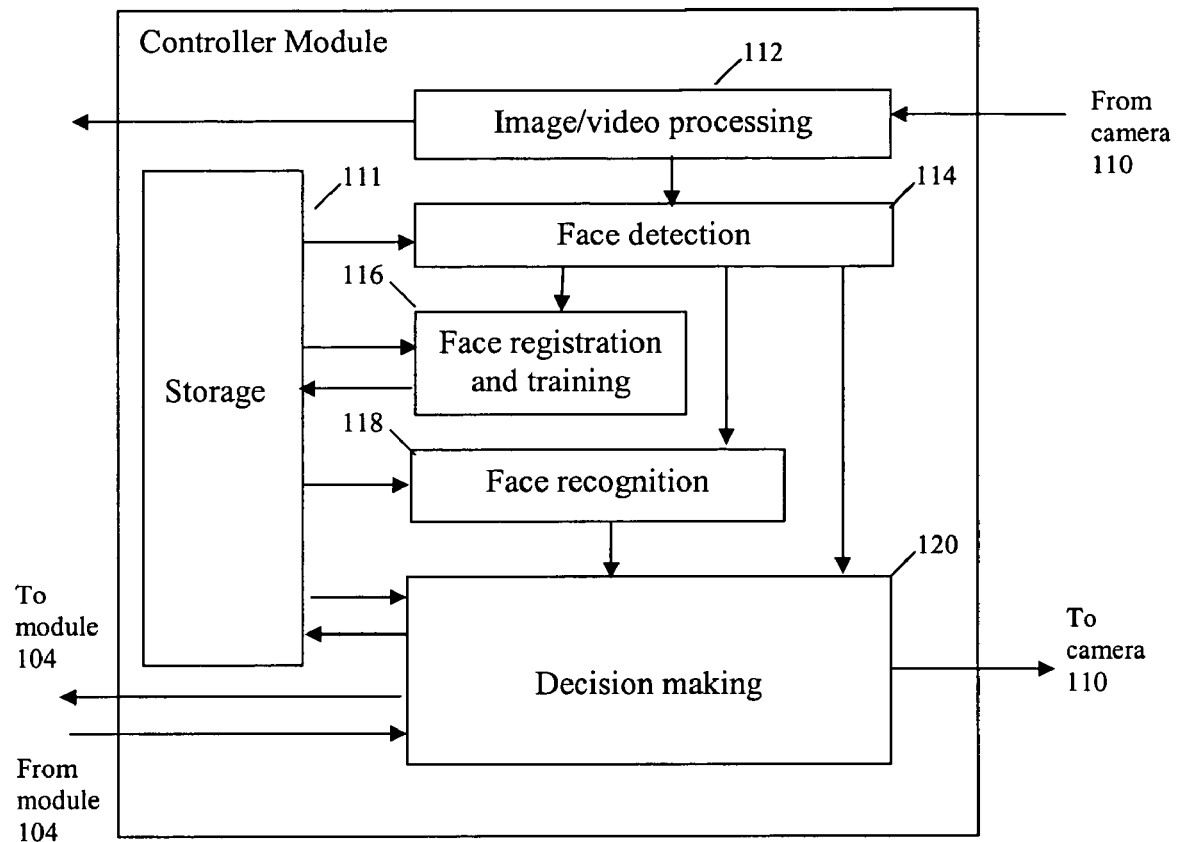
FIG. 2 shows a functional block diagram of the controller module of FIG. 1.

FIG. 2 shows a functional block diagram of the controller module 108, according to an embodiment of the present invention. The controller module include storage (e.g., RAM) 111, image/video processing module 112, face detection module 114, face registration and training module 116, face recognition module 118, and decision making module 120.

The image/video processing module 112 preprocesses the video signals from the video camera 110, by for example, changing the video resolution and frame rate so that the television display 102 can display the video signal from a webcam 110. The input video signal from the camera 110 is also processed by module 112 before sending to the face detection module 114 for detecting faces in the video frames from the camera 110.

The face detection module 114 outputs the location and size of the face(s) detected. For face detection, some pretrained data is needed, which is stored in the storage module 111 of the controller module 108. The output of face detection module 114 can be directly sent to the decision making module 120 to select energy-saving functions such as e.g. automatic power-off. The output from face detection module 114 can also be provided to the face registration and training module 116 which is activated by signal from module 104 for face registration for new users/viewers.

The new training faces are stored in the storage module 111 and all the training faces are used for a training process which outputs some parameters (i.e., the data needed for face recognition, such as like for thresholds, etc.), for the face recognition module 118. These parameters are again stored in the storage 111. The output from the face detection module 114 can also be provided to the face recognition module 118 which based on the parameters stored in the storage 111, generates a face identification (Face ID) for the decision making module 120.

The decision making module 120 controls the video camera 110 based on input from the parameter setting module 104, and outputs personal settings to the parameter setting module 114 based on the Face ID and the pre-stored settings in the storage 111. An advanced parental control function can also be turned on through the remote control so that the decision making module 120 records/logs a user's channel surfing activity into the storage 111 and outputs the surfing activity records to the television display 102 for review.

The parameter setting module 104 accepts input from the controller module 108 change the current settings of the television display 102. The parameter setting module 104 can also accept user commands from the remote control 106 for parameter settings, and also transfer some control signals from the remote control 106 to the controller module 108, for example, switching on/off the video camera 110.

The remote control 106 is used by the user to command the various modules 102, 104, 108 and 110 in FIG. 1. The basic remote control function for the digital video camera 110 is switching it on/off. The switching on/off signal can be sent to the decision making module 120 of the control unit through the parameter setting module 104. The decision making module 120 then transfers the switch on signal to the video camera 110 to turn it on. However, for the turning off signal, the decision making module 120 first determines whether the current user has the authority to turn off the video camera 110, and then sends out the off signal if the current user has such authority. Otherwise, the camera switch off signal is ignored.

Another function of the remote control 106 is face registration mode. In this mode, the face registration and training module 116 adds a face detected to a database, wherein the new user's name can be edited via the remote control 106.

Figure 3:
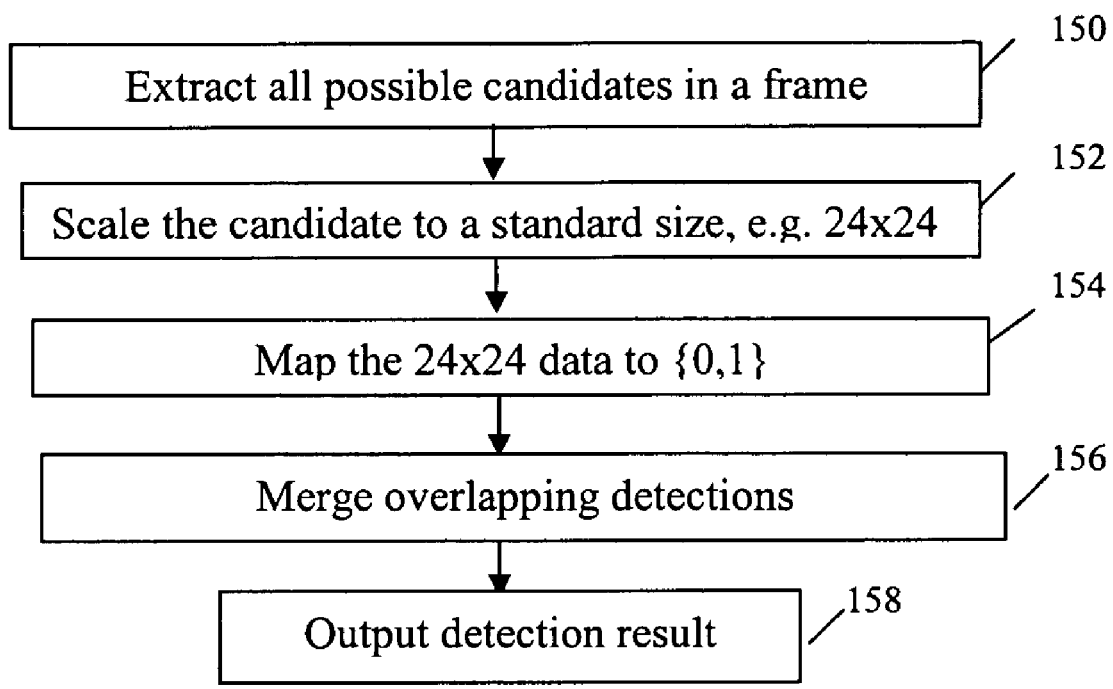
FIG. 3 shows a flowchart of an example face detection approach implemented in the controller module of FIG. 1.

Many approaches for face detection and recognition exist, and any one of such approaches can be implemented in the controller module 108. A brief example process for the face detection module 114 is shown in FIG. 3.

Every possible face candidate, no matter the size and location, is extracted from the frame luminance component for testing. All the candidates in a scene input frame are tested by mapping to a binary value, and detected multiple overlapped faces are merged together to obtain a single output. As such, for each input frame, every possible face candidate, no matter the size and location, is extracted from the luminance component of the input image for testing (step 150). The candidate image window is first scaled to a standard size, for example, 24×24 (step 152). Therefore, there will be a 24×24=384 different grayscale values for each candidate. The 384 different grayscale values are then passed through a function $F_d$ that inputs these grayscales I and outputs a scale value, which is then thresholded to obtain a binary result $d=F_d(I)$ (step 154). If the result is 1, then the candidate is detected as a face, otherwise, it is not a face. The function used to map a standard size window of grayscale values to a binary range includes a set of parameters, which can be obtained offline and then stored in the storage 111.

During offline training for the parameters of $F_d$, we manually label a large number of faces $f_i$, $1 \leq i \leq N_f$, and non-faces $n_j$, $1 \leq j \leq N_n$, where $N_f$ is the number of face samples and the $N_n$, is the number of non-face samples. We find a set of optimal parameters of $F_d$, such that the detection error for the samples is minimized, as:

$$\hat{\Theta} = \arg\min_{\Theta} \left( \sum_{j=1}^{N_n} F_d(\Theta, I_j) - \sum_{i=1}^{N_f} F_d(\Theta, I_i) \right),$$

where $\Theta$ is the parameter set of the function $F_d$. Any of the available face detection approaches can be used to obtain a function $F_d$ together with a set of minimizing parameters.

For a real face in a video frame, there may be many candidates around this face being detected as a face. These detections have overlaps and are then merged together (in step 156) based on the overlapping to a single detection and this single detection result is output (in step 158) to face classification.

The next step can be face registration or face recognition. The TV display 102 includes an empty user list, and all the new users need to be registered. A face registration process can be started from the remote control 106 by an administrative user of the TV display 102, who will initially have access to the face registration mode through a password. After this administrative user's face is registered, no password will be needed if his face is detected by the face recognition module 118.

To register a new user, the administrative user needs to use the remote control 106 to enter the face registration mode. In this mode, the television 102 will show images of a new user directly from the video camera 110, and the user can freeze an image once a good view of the new user is captured. The new user's face is detected and marked with a box, and is then be confirmed by the administrative user through the remote control 106. After confirmation, the detected face is scaled to a standard size and then stored in the storage 111 of the controller module 108. For each new user, a number of faces need to be stored for a better recognition performance. User name is also entered through the remote control 106.

After the registration of all users, a function $F_r$ in module 116 is trained to map from a standard size (e.g. 24×24) to a value ranging from 0 to n, assuming there are n different registered faces. The function $F_r$ takes the grayscales I as input and outputs a category value $r=F_r(I)$, where r=i means the candidate face is face i, and there is no match when r=0. A simple approach for face recognition module 118 involves computing the Euclidean distance from the candidate face from the stored registered faces, wherein the output category corresponds to the smallest value, if smaller than a threshold. If all distance is larger than the threshold, the output is 0.

Other faces recognition approaches can be used to train such a function $F_r$ and its parameters $\Theta$ such that:

$$\hat{\Theta} = \arg\min_{\Theta}\left(\sum_{i=1}^{N} \delta(F_r(\Theta, I_i), c(i))\right),$$

where c(i) is the category number of the registered face $I_i$, N is the total number of the registered faces, and $$\delta(x, y) = \begin{cases} 0 & \text{if } x = y, \\ 1 & \text{if } x \neq y. \end{cases}$$

All the parameters needed for calculating the function $F_r$ are stored in the storage 111 in the controller module 108.

In the regular viewing mode, other than the face registration mode, the result from the face detection module 114 is sent to the face recognition module 118. The face recognition module 118 uses the parameters stored in the storage 111 to obtain a face category number. This number (i.e., the face ID number) is used by the decision making module 120 to make further control decisions.

Figure 4:
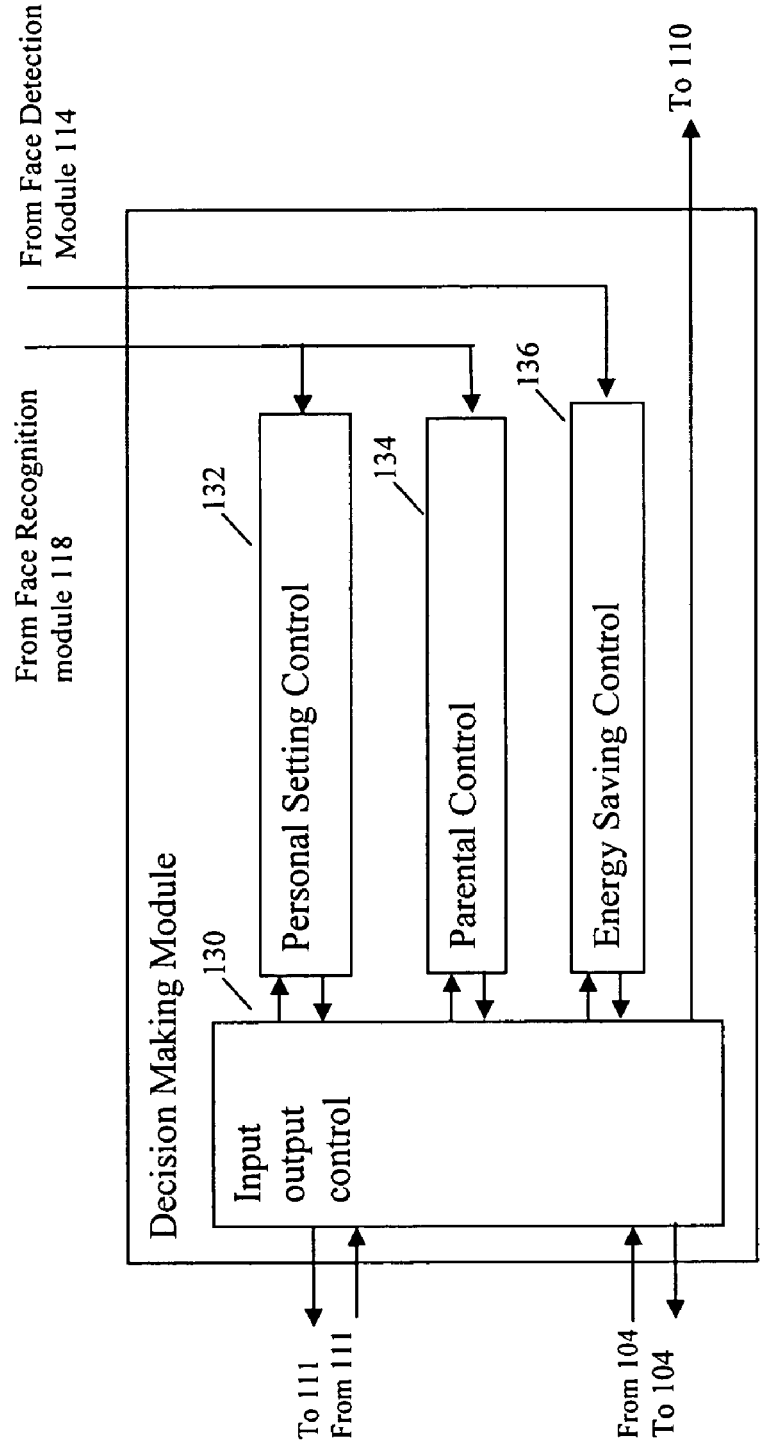
FIG. 4 shows a functional block diagram of the decision making module of the controller module of FIG. 1.

Using the face detection and recognition modules 114, 118, many applications can be added to the television system 100. Three example types of applications according to the present invention include: personal TV settings, parental controls and energy saving controls. FIG. 4 shows a functional block diagram of the decision making module 114 of the controller module 108, wherein based on said three example applications the decision making module 114 includes: a personal settings control module 132, a parental control module 134 and an energy savings control module 136. The decision making module 120 further includes input/output control module 130. The decision making block 120 has inputs and outputs same as in FIG. 2, and the input/output control module 130 therein takes input from modules 104, 111 and output to modules 104, 111 and camera 110.

Personal Settings Functions

The personal settings control module 132 provides personal TV setting application. Based on the video captured by the video camera 110, the face detection and recognition modules 114, 118 determine the viewer(s) and send the information to the personal setting module 132. Module 132 adaptively adjust the television settings based on the viewer(s), the current settings information from input/output control module 130 and output adjusted settings information to module 130. Such settings include e.g. video settings, audio settings, channel settings, etc. The video settings include e.g. color and tint settings, brightness settings, contrast settings, gamma settings, sharpness settings, color temperature settings, etc. The audio settings include e.g. volume settings, adjusting a sound system setting based on the location of the viewer, speaker settings, audio effects settings, etc. Channel settings include e.g. enabling or disabling particular channels, loading a favorite channel set, etc.

For each registered viewer, there is a profile stored in the storage 111 of the controller module 108. When a registered viewer is detected by the face recognition module 118 as the only viewer, all the settings that changed by this viewer are recorded in the storage 111 as the current profile of the viewer. Module 130 has output signals to both storage 111 for recording commands, and parameter setting module 104. The next time when the television 102 is turned on and this viewer is the only viewer, based on signals from the module 130, the settings in the viewer's profile are loaded from the storage 111 to the parameter settings module 114 of the television by the decision making module 120. If there are multiple users detected, the personal settings will not be loaded and the new settings during this viewing period will not be recorded.

In addition, based on the videos captured from the digital video camera 110, the image/video processing module 112 (FIG. 2) can estimate the lighting condition of the surroundings. Based on the estimation, the controller module 108 will then adaptively adjust the color settings of the television display 102 to optimize the viewer's perception under different lighting conditions. Further, with a detected face, the decision module 120 can compute the distance between the viewer and the television display 102 (e.g., based on size of the face) and accordingly adjust the TV video, color tuning, audio settings, etc., for the particular distance to improve the performance of the television 102.

The module 108 can further implement receiving video signal from the camera 110, detecting and recognizing particular motions in image of a person in the video signal via modules 114-118, and performing an intelligent task based on recognized motions via module 120.

In another implementation, the module 120 selectively performs: turning on the television display, turning off the television display, changing channels, tuning to a particular channel, changing television display speaker volume, selecting a preset color/sound mode, etc.

Parental Control Functions

For each new user that is registered, the administrative user (e.g., a parent) can set the accessible channels for that new user (e.g., child). By default, all the channels are accessible. With parental control module 134, the administrative user can block particular channels or select particular accessible channels. Based on the output from the video camera 110, the face detection and recognition modules 114, 118 determine who the viewer is. Under control of parental control module 134, if there is only one viewer, that viewer's accessible channels are enabled and other channels are blocked, and when multiple viewers are detected, the union of the accessible channels from all these viewers becomes accessible.

The input from module 118 to the parental control module 134 includes viewer ids. Outputs of module 134 include determined accessible channel list, recording commands, etc. Module 130 provides accessible channel list for each viewer as stored in memory, to module 134.

In addition, under control of parental control module 134, the administrative user can set whether to record the channel surfing activities for each viewer. If this is set, when a viewer is detected, the channel surfing activities of the viewer are recorded (via a command from module 134 through the input/output control module 130) in the storage ill, and the administrative user uses the remote control 106 to review these activities. Those activities may include e.g. the start viewing time, end viewing time of each channel viewed by the viewer, etc.

The administrative user can also set a quota for each viewer (user). Once this is set for a viewer, and that viewer is detected as one of the viewers, his/her viewing time is counted by sub-module 134. The quota can be a daily quota, weekly quota, a one-time-viewing quota, etc. If all the detected viewers have reached their quota, the television 102 automatically powers off based on command from module 134 through input output control module 130. Daily quota and weekly quota will be reset automatically at the beginning of each day/week by module 134.

Using the remote control 104, the administrative user can also control the accessible input sources of the television 102. In example, if a DVD player is connected to a DVI-1 input of the television 102, and a game station output is connected to a HDMI interface of the television 102. Further, using the remote control 104, the administrative user can control the accessible input source for each viewer and set another time quota for each of the input sources. For example, the input source from DVD players might be disabled for one viewer, and the input source from Play Station may be subject to another time quota of usage for this viewer.

Improved Energy Saving Functions

As shown in FIG. 4, the output from the face detection module 114 is directly sent to the energy saving control module 136. Based on the output from the face detection module 114, if there is no viewer in front of the TV 102 for a certain amount of time, the energy saving control module 136 sends control signals (through input/output control module 130) so that the television 102 turn down its brightness and eventually turn off the power. The brightness is turned back up by the TV 102 if there is some reaction to the turning down, with the command from decision making module 120. If there is no reaction, the TV 102 is turned off, with the command from decision making module 120 after a certain amount of time.

Screen saver mode can also be available for television 102, with the output from face detection module 114. Instead of turning down the brightness, the television 102 can be switched to a screen saver mode, with a command from decision making module 120. In screen saver mode, for instance, the television 102 can be showing the family albums stored in the storage module 111.

Module 118 signals modules 132 and 134 with the viewer ids, and module 114 signals whether there is any viewer. Sub-modules 132, 134 and 136 signal commands out through input output control module 130. All sub-modules 132, 134 and 136 interact with the storage module 111 and remote control 104 through the input/output control module 130.

While the present invention is susceptible of embodiments in many different forms, these are shown in the drawings and herein described in detail, preferred embodiments of the invention with the understanding that this description is to be considered as an exemplification of the principles of the invention and is not intended to limit the broad aspects of the invention to the embodiments illustrated. The aforementioned example architectures above according to the present invention can be implemented in many ways, such as program instructions for execution by a processor, as logic circuits, as ASIC, as firmware, etc., as is known to those skilled in the art. Therefore, the present invention is not limited to the example embodiments described herein.

The present invention has been described in considerable detail with reference to certain preferred versions thereof; however, other versions are possible. Therefore, the spirit and scope of the appended claims should not be limited to the description of the preferred versions contained herein.

What is claimed is:

1. A television control system, comprising:
   A/V devices including a television display and a digital video camera, and
   a controller module that performs event detection based on video signals from each camera and controls the television;
   a face detection module for detecting an image of a face in video frames of the video signal from the camera;
   a face registration and training module for registering the image;
   a face recognition module which based on said face detection and said registrations, generates a face identification based face recognition of the image; and
   a decision making module that controls the television based on face detection and face recognition, wherein the decision making module performs a task based on the recognized image and enables or disables a set of preset program television channels.

2. The system of claim 1 wherein the decision making module enables or disables a set of input sources to the television display based on face recognition.

3. The system of claim 1 wherein the decision making module monitors and stores channel surfing activities.

4. The system of claim 3 wherein in addition to said channel surfing activities, the decision making module further stores channel name, start watching time, end watching time, and total watching time.

5. The system of claim 4 wherein the decision making module disables one or more channels based on the total watching time and a preset allowed watching time for one or more channels.

6. The system of claim 5 wherein the decision making module resets the time quota periodically.

7. The system of claim 1 wherein the decision making module loads into the television display personal video settings based on face recognition.

8. The system of claim 1 wherein the decision making module loads into the television display personal audio setting based on face recognition.

9. The system of claim 1, wherein the decision making module sends a control signal to the television display to enter into energy saving mode based on face detection not detecting the image in a scene.

10. The system of claim 1, wherein the decision making module sends a signal to the television display to lower brightness and thereafter eventually turn off based on face detection.

11. The system of claim 1, wherein the decision making module sends signal to television display to display preset images based on face detection.

12. The system of claim 1, wherein the decision making module adjusts the sound system setting based on the location of the image.

13. The system of claim 1, wherein the decision making module computes a distance relative to the television displays, and tunes television color settings based on the distance.

14. An application method for a television system including a television display and a digital video camera, and a controller, the method comprising:
   receiving video signals from the camera;
   the controller detecting whether the video signals include an image of a face;
   recognizing the image in the video signals;
   performing an intelligent task based on the recognized image for recording events of channel surfing, with the events including activities channel name, start watching time, end watching time, and total watching time, based on the recognized image;

enabling or disabling a set of preset program television channels based on the recognized image; and disabling one or more channels based on the total watching time and a preset allowed watching time quota for said one or more channels.

15. The method of claim 14 further including the steps of the resetting the time quota periodically.

16. An application method for a television system including a television display and a digital video camera, and a controller, the method comprising:
receiving video signals from the camera;
detecting an image of a face in the video signal with the controller;
registering the image in the face;
recognizing the image in the video signal;
generating a face identification based on recognizing the face in the image; and
performing an intelligent task controlling the television based on the recognized image for enabling or disabling a set of present program television channels and loading personal video settings based on the recognized image.

17. The method of claim 16 wherein performing an intelligent task based on the recognized image further includes the steps of loading personal audio setting based on the recognized image.

18. The method of claim 16 further comprising sending a signal to the television display to turn the brightness lower gradually and turn the power off based on detecting the image.

19. The method of claim 16 further comprising
signaling the television display to start a power saving mode based on detecting the image.

20. The method of claim 16 wherein performing the intelligent task based on the recognized image further includes adjusting television display sound setting based on a location relative to the camera.

21. The method of claim 16 wherein performing the intelligent task based on the recognized image further includes directing the angle of the display, a speaker, the camera, or a combination thereof towards a location.

22. The method of claim 16 wherein performing the intelligent task based on the recognized image further includes computing a distance relative to the camera based on the size of the image and tuning display color settings based on the distance.

23. A television control system, comprising:
A/V devices including a television display and a digital video camera;
a controller module that performs event detection based on video signals from each camera and controls the television;
a remote control that allows a user to command the A/V devices and the controller module;
controller module including:
a face detection module that detects faces in video frames from the camera;
a face registration and training module for face registration for new viewers;
a face recognition module which based on said face detection and said registrations, generates a face identification; and
a decision making module that selectively controls the television based on user commands, face detection and face recognition;
wherein the decision making module comprises:
a personal setting control module that allows personal TV setting application based on viewer face recognition;
an administrative control module that enables television viewing control over viewers based on viewer face recognition; and
an energy saving control module that based on face detection enables energy saving mode.

24. The system of claim 23 wherein the controller module selectively performs one or more of:
turning on the television display;
turning off the television display;
changing channels;
tuning to a particular channel;
changing television display speaker volume; selecting a preset color/sound mode.

* * * * *